Aug. 16, 1960    J. S. MACKAY    2,949,484
PREPARATION OF GUANIDINE COMPOUNDS
Filed Aug. 13, 1957
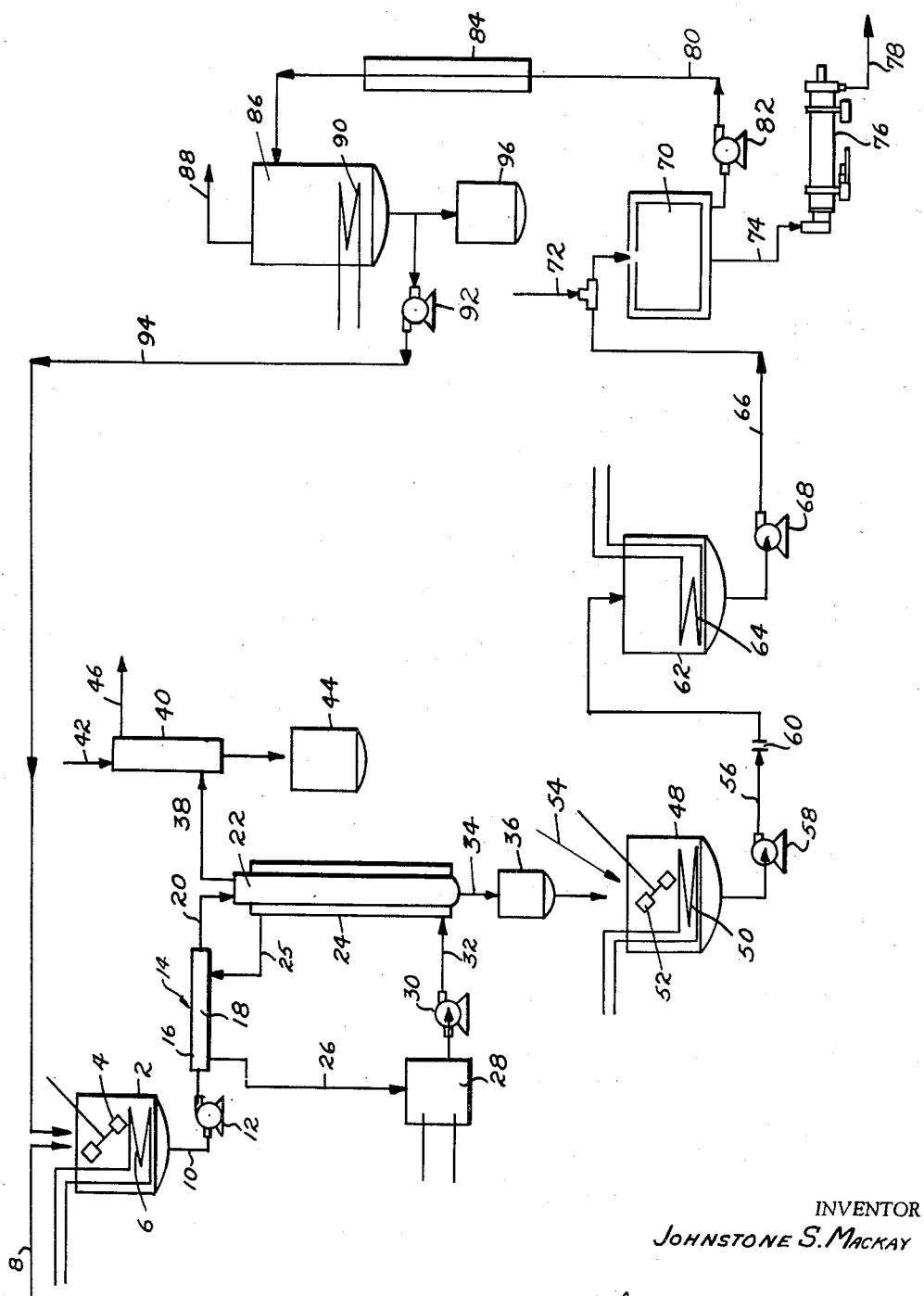
INVENTOR
JOHNSTONE S. MACKAY
BY Cushman, Darby & Cushman
ATTORNEYS United States Patent Office 2,949,484
Patented Aug. 16, 1960

2,949,484

PREPARATION OF GUANIDINE COMPOUNDS

Johnstone S. Mackay, Pittsburgh, Pa., assignor to Pittsburgh Coke & Chemical Company, Pittsburgh, Pa., a corporation of Pennsylvania Filed Aug. 13, 1957, Ser. No. 677,959

15 Claims. (Cl. 260—564)

This invention relates to the preparation of guanidine, substituted guanidines, guanidine nitrate, and substituted guanidine nitrates.

In Boatright et al. Patent No. 2,783,276, there is disclosed the preparation of guanidine salts by forming a reaction mixture of a porous adsorbent gel, urea, an N-alkyl or N,N-dialkyl urea and an ammonium salt of nitric, phosphoric, hydrochloric, citric, acetic or oxalic acid using a ratio of the urea to ammonium salt of from 1:10 to 10:1 and a temperature of from 175° C. to 300° C. In Example 1 of the Boatright patent, utilizing urea and ammonium nitrate, there are employed 2 mols of urea to 1 mol of ammonium nitrate which is the theoretical ratio for the reaction. The patentees indicate that the ratios of materials are not critical. According to the patent, there is obtained a weight yield of between 20 and 30% of guanidine nitrate based on the urea consumed in the reaction. While such a procedure is useful, the yields of guanidine obtained are undesirably low.

It is an object of the present invention to obtain guanidine and substituted guanidines from urea and substituted ureas in increased yields.

Another object is to obtain an increased conversion of urea to guanidine in a single pass.

A further object is to reduce the amount of side reactions in converting ureas to guanidines.

A still further object is to develop a cyclic process for converting urea to guanidine.

Yet another object is to prepare guanidine nitrate of increased purity from urea and ammonium nitrate.

An additional object is to reduce the time required to convert urea to guanidine.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be obtained by observing certain critical limitations in the reaction of converting the urea to guanidine.

These conditions include the continuous feeding of urea or substituted urea and ammonium nitrate or substituted ammonium nitrate as a liquid mixture to an upright column of a silica containing catalyst. The molten urea and ammonium nitrate react during the gravity flow through the column. It is critical that the ammonium salt employed be a nitrate since only when an ammonium nitrate is used, the yields are 90% or better based on the weight of the urea. It is also critical that the catalyst employed be a silica containing catalyst. However, in contrast to the Boatright et al. patent, the silica need not be in the form of a porous absorbent gel; there can be employed, for example, a silica smoke obtained by burning silicon tetrachloride, and even silicic acid can be employed. Even standard silica-alumina cracking catalyst can be used.

It is also important that the process be carried out at substantially atmospheric pressure or below since either ammonium carbonate pressure or carbon dioxide pressure stops the reaction from going.

The mol ratio of urea to ammonium nitrate has also been found to be critical. While a mol ratio of urea to nitrate of from 1:1 to 1:6 can be employed, the preferred mol ratios are from 1:2 to 1:3. These mixtures are surprisingly stable and little undesired urea decomposition occurs. The temperature of reaction can be from 175° C. to 225° C., but preferably is between 190° C. and 200° C. At temperatures of above 200° C. there is a noticeable increase in oxidation of urea to nitrogen and carbon dioxide with a net ultimate loss in the amount of the urea which can be converted to guanidine. At temperatures below 190° C. there is a fall off in the amount of urea converted to guanidine in a single pass.

By the instant process it is possible in a single pass to convert over 75% of the urea reacted to guanidine and it is also possible by recycling to convert over 90% of the urea employed to guanidine. Conversion of urea to guanidine has been successfully employed in the presence of silica bed depths of from 6 to 40 inches with 24 to 36 inches being preferred.

The average time of contact between the reactants and the silica bed is usually 10 to 60 minutes and preferably 15 to 30 minutes. The particle size of the silica is not particularly critical but generally is between 4 and 40 mesh to afford optimum contact with a minimum of packing.

It has been observed that the water insoluble urea decomposition products are eliminated by the use of the present invention. Additionally, there is avoided the exotherm from the heat of wetting fresh silica which it has been discovered leads to increased oxidation of the urea to by-products. An excess of the silica agent is always present in the instant process and this aids in speeding the reaction.

Preferably, the mixture of urea and ammonium nitrate are fed to the columnar silica reactor at about the flooding feed rate although, as indicated, other rates can be employed. Operating under the preferred conditions, a liquid which is largely guanidine nitrate and ammonium nitrate is withdrawn from the bottom of the column.

While preferably guanidine is formed by reacting urea with ammonium nitrate, it is also possible to form substituted guanidines by reacting substituted ureas with ammonium nitrate or by reacting urea with amine or substituted amine nitrates. Thus, in place of urea there can be employed N-alkyl ureas such as N-methyl urea, N-ethyl urea, N-butyl urea, N-hexyl urea, N-octyl urea and N-stearyl urea, N,N-dialkyl ureas such as N,N-dimethyl urea, N,N-diethyl urea, N,N-dibutyl urea, and N,N-dioctyl urea as well as N-aryl and N,N-diaryl ureas such as N-phenyl urea, N,N-diphenyl urea, N-p-tolyl urea, N,N-di-p-tolyl urea, and N,N'-diphenyl urea.

To form substituted guanidines in place of ammonium nitrate, there can be employed substituted amine nitrates such as methyl amine nitrate, ethyl amine nitrate, butyl amine nitrate, diethyl amine nitrate, etc.

Thus, there can be formed in addition to guanidine, alkyl and aryl substituted guanidines such as methyl guanidine, ethyl guanidine, butyl guanidine, hexyl guanidine, octyl guanidine, stearyl guanidine, dimethyl guanidine, diethyl guanidine, dibutyl guanidine, dioctyl guanidine, phenyl guanidine, diphenyl guanidine, etc, The single figure of the drawings illustrates in diagrammatic form a preferred form of carrying out the invention.

Referring more specifically to the drawing, there is provided a feed tank 2 provided with stirrer 4 and heating coils 6 to maintain the tank at 150° C. to 175° C. Fresh urea and ammonium nitrate are fed into tank 2 through line 8. The mixture then passes via line 10 and pump 12 to the upper chamber 16 of heat exchanger 14 where it is heated to reaction temperature, 175° C. to 225° C., in countercurrent to Dowtherm heat exchange fluid in the lower chamber 18. This heating prevents cooling of the silica bed. The urea-ammonium nitrate mixture which has thus been raised in temperature passes through line 20 to the top of reactor 22 which is kept at about 195° C. with the aid of Dowtherm liquid in jacket 24. The Dowtherm liquid passes from jacket 24 to line 25 and then in countercurrent flow to the urea-ammonium nitrate through heat exchanger 14 to line 26 and Dowtherm heater 28 and thence via pump 30 and line 32 again to the jacket 24 of reactor 22 to complete the cycle of heating fluid. Reactor 22, which has a diameter of one inch, is filled with the silica catalyst to the desired bed depth. The reaction mixture after percolating through the bed of silica emerges through line 34 into catch pot 36. Ammonia and carbon dioxide formed in the reaction, as well as any other decomposition gases, pass via by-pass line 38 to condenser 40. Water is introduced through line 42 to absorb the ammonia and carbon dioxide which then pass together with any other materials which have been swept into line 38 and either dissolved in the water or condensed in condenser 40 to condensate tank 44 from which they can be periodically removed and recovered. Non-water soluble gases pass out through line 46.

The molten guanidine nitrate product in the meantime is passed to dissolver 48 equipped with heating coils 50 and stirrer 52. Sufficient hot water (about 95° C.), generally about 1 to 1.5 vol. per vol. of molten product, is added to dissolver 48 through line 54 to dissolve the product. The mixture is rendered uniform with the aid of stirrer 52. The solution is then passed via line 56 and pump 58 through filter 60 to crystallizer 62. It is not essential to employ filter 60 since the solution was clear but the use of this filter is a safety factor. Crystallizer 62 is provided with cooling coils 64 to cool the solution to room temperature. The guanidine nitrate thereby crystallizes. The mixture is pumped via line 66 and pump 68 to centrifuge 70. About 0.5 part by weight of cold wash water is added through line 72 per part of guanidine nitrate crystals. The guanidine nitrate crystals then go from centrifuge 70 through line 74 to drier 76 from which they emerge through line 78 in a state of 97–98% purity.

The combined mother liquors emerge from centrifuge 70 via line 80 and pump 82 to heat exchanger 84 where they are heated. The liquids are then sent to evaporator 86 where water is removed under vacuum through line 88 and the mother liquor evaporated to dryness. Evaporator 86 is maintained at about 150° C. with the aid of heating coils 90. Molten ammonium nitrate, urea and guanidine nitrate are recycled via pump 92 and line 94 to feed tank 2. Tank 96 is a holding pot which can be used in emergencies.

By the addition of a minimum amount of hot water through line 54, a high percentage of guanidine nitrate crystallizes out when the mother liquor is cooled. The ammonium nitrate and the small amount of urea which also crystallize out can be removed with one small water wash at centrifuge 70 as explained. The resulting guanidine nitrate crystals are at least 95% pure and usually 98% or better. The equation for the reaction is

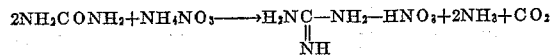

*Example 1*

A semi-continuous run was made for eleven six-hour days using the apparatus of the drawing as described above. Reactor 22 contained 225 grams of 6 x 16 mesh (U.S. Standard Sieve Series) silica gel having a bed depth of 24 inches. The column diameter as previously stated was one inch. The molten mixture of ammonium nitrate and urea was fed at a temperature of 175° C. through line 20 into reactor 22. The average feed rate was 2.6 cc. per minute. The average temperature within the reactor 22 was 192° C. The material balance on a weight basis for fresh material introduced through line 8 and recycle material introduced through line 94 was 1.08 parts of fresh urea and 0.72 part of fresh ammonium nitrate were mixed in tank 2 with 0.12 part of recycle urea, 2.36 parts of recycle ammonium nitrate and 0.1 part of recycle guanidine nitrate. The reaction mixture was dissolved in 1.5 parts of hot (100° C.) water per part by volume of the mixture in dissolver 48. The solution was completely clear and there was no need of filtration even after 11 recycles. The solution was cooled to room temperature in crystallizer 64, the guanidine nitrate crystals filtered off and washed once with 0.5 part of water in centrifuge 70. These crystals were then dried in drier 76 and given 1.0 part of pure guanidine nitrate. The combined mother liquor was evaporated to dryness in evaporator 86 and the molten residue fed back to the feed through line 94. The gas products emerging from the top of reactor 22 were collected and analyzed. There were 0.3 part of ammonia, 0.39 part of carbon dioxide, and 0.01 part of nitrogen. Guanidine nitrate purity was readily maintained at 97–98%.

At the end of the 11 day period, 3,572 grams of urea had been consumed as well as 2,441 grams of ammonium nitrate. The products obtained were 3,229 grams of guanidine nitrate, 2,237 grams of ammonium carbonate and 330 grams of unaccounted for by product. The yields obtained were 87% based on the ammonium nitrate reacted and 89% based on the urea reacted. Conversion per pass based on the urea was 77% on the first day and 80% on the last. There was no impurity buildup in the recycle material and no problems were noted throughout the entire operation.

The effect of temperature on yields was measured both on the conversion in the column of urea to guanidine in a single pass and also on the net yield. In the temperature range of 185–215° C., it was found that the conversion to guanidine in a single pass was the more important measurement. The reason for this is that the yield based on urea reacted is maintained very well until appreciable oxidation occurs. This oxidation becomes significant at temperatures of 200° C. and above. However, for temperatures between 190 and 215° C., the economies of increased yield per pass outweigh the relatively small amount of increased overall loss due to urea oxidation. Temperatures of 190 to 200° C. are especially preferred due to the combination of relatively small loss of urea due to oxidation and the relatively high rate of urea conversion per pass. This is illustrated in Example 2 wherein the same apparatus was employed as in Example 1. The reactor contained silica gel having a bed depth of 24 inches. The mol ratio of ammonium nitrate to urea was 2 to 1.

*Example 2*

| Temperature, ° C. | Percent Urea Oxidized | Percent Urea Converted to guanidine per pass |
|---|---|---|
| 186–188 | 6 | 54 |
| 188–190 | 8 | 64 |
| 192 | 8 | 78 |
| 192–193 | 9 | 81 |
| 204–205 | 14 | 78 |
| 212 | 14 | 70 |

The effect of silica bed depth and temperature is shown in Example 3 employing silica gel and in which the apparatus of Example 1 was also employed. While as previously stated, bed depths above 32 inches can be employed normally, there is a slow up in throughput resulting from such increased bed depths without a compensating increase in yields. The mol ratio of ammonium nitrate to urea was 2 to 1.

*Example 3*

| Bed Depth, Inches | Temperature, °C. | Conversion to guanidine per pass based on urea |
|---|---|---|
| 6 | 185 | 19 |
| 18 | 186 | 52 |
| 24 | 188 | 64 |
| 12 | 190–191 | 64 |
| 18 | 192–193 | 76 |
| 24 | 192–193 | 81 |
| 32 | 188 | 62 |

The mol ratio of ammonium nitrate to urea is also important as is shown by Example 4. While the equation for the reaction requires 2 mols of ammonium nitrate per mol or urea, surprisingly this ratio gives relatively poor yields of the desired guanidine. Using the apparatus of Example 1, a silica gel bed depth of 6 inches and a temperature of reaction of 190° C., the results obtained were:

*Example 4*

| Mol Ratio (ammonium nitrate to urea) | Conversion of urea to guanidine per pass |
|---|---|
| 1:2 | 26 |
| 1:1 | 34 |
| 2:1 | 48 |

*Example 5*

While, as previously stated, the use of silica gel is preferred, there can be employed other forms of silica in the present columnar reaction. Thus, a batch operation was carried out using the apparatus of Example 1 and with the column filled to a depth of 2 inches with an aqueous sodium silicate solution containing 37.3% solids and a 1:3.3 ratio of sodium oxide to silicon dioxide. The reaction was carried out at a temperature of 200° C. and with a mol ratio of ammonium nitrate to urea of 2 to 1. A yield of 30% guanidine based on the urea employed was obtained.

*Example 6*

The reactor of Example 1 was filled to a depth of 1.5 inches with silicic acid and the reaction was carried out as a batch operation at a temperature of 200° C. with a mol ratio of ammonium nitrate to urea of 2 to 1. A yield of 60% guanidine based on the urea employed was obtained.

*Example 7*

Using the apparatus of Example 1, the reactor was filled to a bed depth of 24 inches with a standard silica-alumina catalyst containing 12.5% alumina and the balance silica. Using a reaction temperature of 190° C. and a mol ratio of ammonium nitrate to urea of 2 to 1, the yield of guanidine based on the urea reacted was 76%.

*Example 8*

When the reactor of Example 1 was filled to a depth of 3 inches with Aerosil prepared by burning silicon tetrachloride with air, a yield of 50% guanidine based on the urea employed was obtained using a reaction temperature of 200° C. and a mol ratio of ammonium nitrate to urea to 6 to 1.

While the invention is not limited to any theory of reaction, it appears that the silica catalyst does not dehydrate the urea to the nitrile but instead a decarbonation occurs in which carbon dioxide is split out from some intermediate. Two results indicate this conclusion very strongly. If the mechanism of the reaction was the splitting off of water from urea, then carbon dioxide pressure should have no effect on the yields. Actually, as pointed out previously, it is important to avoid carbon dioxide buildup. Secondly, since aqueous sodium silicate catalyzes the reaction, it is very unlikely that water elimination is part of the reaction mechanism.

The present invention includes the novel features of using a columnar silica reactor, the feeding of liquid stable mixtures of urea and ammonium nitrate, water quenching combined with recycling of excess ammonium nitrate, the use of much higher ratios of urea and ammonium nitrate to silica gel than in the prior art due to the continuous nature of the instant reaction, the recognition of specific proportions of urea to ammonium nitrate and the recognition that only nitrates can be employed for outstanding yields.

I claim:

1. A process of preparing a guanidine nitrate comprising the steps of forming a liquid reaction mixture of 1 mol of a urea compound of the group consisting of urea, N-alkyl urea, N,N-dialkyl urea, N-phenyl urea, N-tolyl urea, N,N-diphenyl urea and N,N-ditolyl urea with 1 to 6 mols of a nitrate of the group consisting of ammonium nitrate, a monoalkylamine nitrate and a dialkylamine nitrate, passing said liquid mixture through a column of silica containing catalyst at a temperature of from about 175 to about 225° C. and recovering the guanidine nitrate.

2. A process according to claim 1 wherein the unreacted nitrate and urea compound are separated from the guanidine nitrate compound formed and are recycled, mixed with make-up urea compound and nitrate and again passed through the silica containing catalyst.

3. A process according to claim 2 wherein the depth of the bed of silica containing catalyst is about 24 to 36 inches and the reaction temperature is about 190 to 200° C.

4. A process of preparing guanidine nitrate comprising the steps of forming a liquid reaction mixture of 1 mol of urea with 1 to 6 mols of ammonium nitrate, passing said liquid mixture through a column of a silica containing catalyst at a temperature of from 175 to about 225° C. and recovering the guanidine nitrate.

5. A process according to claim 4 wherein the mol ratio of urea to ammonium nitrate is from about 1:2 to 1:3.

6. A process according to claim 4 wherein the unreacted ammonium nitrate and urea are separated from the guanidine nitrate and are recycled together with make-up urea and ammonium nitrate and again passed through the silica containing catalyst.

7. A process according to claim 4 wherein the depth of the bed of silica containing catalyst is about 24 to 36 inches.

8. A process according to claim 4 wherein the temperature is about 190 to 200° C.

9. A process according to claim 4 wherein the mol ratio of urea to ammonium nitrate is from about 1:2 to 1:3, the depth of the bed of silica containing catalyst is about 24 to 36 inches and the reaction temperature is about 190 to 200° C.

10. A process according to claim 4 wherein the catalyst is silica gel.

11. A process according to claim 4 wherein the catalyst is a silica-alumina catalyst containing a preponderant amount of silica.

12. A continuous process of preparing guanidine nitrate comprising the steps of forming a liquid reaction mixture of 1 mol of urea with about 2 mols of ammonium nitrate, passing said liquid mixture through a column 24 to 36 inches deep of a silica containing catalyst at a temperature of about 190-200° C. to form a molten product including guanidine nitrate, dissolving the molten product in hot water, cooling the solution to separate out crystals of guanidine nitrate, washing the crystals to remove mother liquor therefrom, drying and recovering the guanidine nitrate crystals, evaporating the mother liquor to dryness at a temperature at which the mixture of ammonium nitrate and urea in the mother liquor is molten, recycling the molten ammonium nitrate and urea mixture recovered from the mother liquid, adding make-up ammonium nitrate and urea in a mol ratio that when the make-up is added to the molten recycle composition the ratio of urea to ammonium nitrate is again about 1 mol to 2 mols and passing this mixture through the column of silica.

13. A process according to claim 12 wherein the pressure is atmospheric pressure.

14. A process according to claim 12 wherein the silica containing catalyst is silica gel.

15. A process according to claim 4 wherein the depth of the bed of silica containing catalyst is about 12 to 32 inches.

References Cited in the file of this patent

UNITED STATES PATENTS 2,783,276      Boatright et al. _____ Feb. 26, 1957
(Filed Nov. 22, 1955, C.P. application Sept. 18, 1953)

OTHER REFERENCES

Calmon et al.: "Ion Exchangers in Organic and Biochemistry," Interscience, New York (1957), pages 658–661, 675.